United States Patent [19]

Pocklington et al.

[11] Patent Number: 5,197,740
[45] Date of Patent: Mar. 30, 1993

[54] GOLF BALL HAVING IMPROVED COVER COMPOSITION

[75] Inventors: Terence W. Pocklington; Terry R. Balch, both of Tupelo, Miss.

[73] Assignee: Ram Golf Corporation, Melrose Park, Ill.

[21] Appl. No.: 561,773

[22] Filed: Aug. 2, 1990

[51] Int. Cl.$^5$ .................. A63B 37/12; C08L 33/02
[52] U.S. Cl. ....................... 273/235 R; 260/998.14; 524/908; 525/194
[58] Field of Search ............ 525/194; 524/908; 260/998.14; 273/235 R

[56] References Cited

U.S. PATENT DOCUMENTS

| | | | |
|---|---|---|---|
| 3,289,272 | 8/1966 | Hess | 525/221 |
| 3,437,718 | 4/1969 | Rees | 525/195 |
| 3,454,280 | 7/1969 | Harrison et al. | 273/235 R |
| 3,819,768 | 7/1974 | Molitor | 273/235 R |
| 4,323,247 | 4/1982 | Keches et al. | 260/998.14 |
| 4,337,947 | 7/1982 | Saito et al. | 273/235 R |
| 4,690,981 | 9/1987 | Statz | 525/221 |
| 4,884,814 | 12/1989 | Sullivan | 273/235 R |
| 4,911,451 | 3/1990 | Sullivan et al. | 273/235 R |
| 5,000,459 | 3/1991 | Isaac | 273/235 R |

*Primary Examiner*—Allan M. Lieberman
*Attorney, Agent, or Firm*—Jones, Day, Reavis & Pogue

[57] ABSTRACT

An novel golf ball is disclosed having an improved cover composition comprising a blend of a first copolymer of an olefin and a sodium salt of an unsaturated carboxylic acid, a second copolymer of an olefin and a zinc salt of an unsaturated carboxylic acid, and a third copolymer of an olefin and a lithium salt of an unsaturated carboxylic acid. The novel golf balls having the improved cover compositions exhibit improved playing properties.

5 Claims, No Drawings

GOLF BALL HAVING IMPROVED COVER COMPOSITION

BACKGROUND OF THE INVENTION

This invention relates to a novel golf ball having an improved cover composition, which cover composition imparts superior properties to the golf balls. More particularly, this invention relates to a novel golf ball having an improved cover composition such that the resulting golf ball exhibits improved initial velocity, superior aging characteristics, improved coefficient of restitution, and better low temperature impact properties.

Golf balls having cover compositions which generally comprise a copolymer of an olefin and at least one unsaturated carboxylic acid are known in the prior art. These cover material compositions are sold under the trademark "Surlyn" by the E. I. du Pont de Nemours Company, Wilmington, Del. The cover compositions are highly advantageous in that the resulting covers are extremely resistant to cuts and abrasion. These balls are commonly referred to in golfing circles as cutless balls. These prior art golf balls are generally described in U.S. Pat. No. 3,454,280, issued on Jul. 8, 1969.

While being extremely advantageous from the standpoint of cut resistance, the golf balls as described in U.S. Pat. No. 3,454,280 have a shortcoming in that they do not have cold temperature cracking properties such as to permit their use at temperatures below freezing. In fact, when the balls of the prior art are played at temperatures below 32° F., they have a tendency to crack or explode when struck by a golf club. Likewise, the balls of this patent are lacking in their coefficient of restitution, a property related to the distance which a golf ball can be driven.

One attempt to overcome the problems of these prior art golf balls is described in U.S. Pat. No. 3,819,768, issued Jun. 25, 1974. This patent describes golf ball covers made of compositions comprising at least two different ionic copolymers which are produced by the reaction of an olefin having from two to five carbon atoms with a metal salt of an unsaturated carboxylic acid containing from three to eight carbon atoms. In particular, the disclosed cover compositions of that patent comprise mixtures of a copolymer of an olefin and a sodium salt of an unsaturated monocarboxylic acid and a copolymer of an olefin and a zinc salt of an unsaturated monocarboxylic acid. This patent is owned by Questor Corp., manufacturer of golf balls sold under the trademark TopFlite. While the Questor patent claims that all commercially available blends of ionomer resins of different metal ions, i.e., all blends of zinc ionomer resins and sodium ionomer resins, will have the improved coefficient of restitution, it has been found that most blends of these two resins, other than the Surlyn 1555 and Surlyn 1557 as specifically set forth in the Questor patent, do not have an improved coefficient of restitution. It has also been discovered that these blends are generally cut when subjected to the so-called guillotine test.

Another attempt to overcome the problems of the prior art golf ball cover compositions is disclosed in U.S. Pat. No. 4,323,247 issued Apr. 6, 1982. That patent discloses a triblend composition comprising two sodium-based Surlyn resins and a zinc-based Surlyn resin, wherein each of the three resins has specific limitations on the percentage of free acid, the percentage of total acid, the percentage of metal ion content, and the average melt flow. While this patent discloses golf balls of improved coefficient of restitution and initial velocity, it does not disclose improved cold temperature impact properties or aging properties.

SUMMARY OF THE INVENTION

It is thus one object of the invention to provide a novel golf ball having an improved cover which imparts improved properties to a golf ball.

It is another object of the invention to provide a novel golf ball having an improved cover which imparts improved cut and abrasion resistance, cold temperature impact properties, aging properties, coefficient of restitution, and initial velocity.

Other objects, advantages, and novel features of the invention may be seen and understood from the description of the invention herein and the appended claims.

In accordance with the invention, a novel golf ball is provided having an improved cover made from a new composition. The improved cover imparts improved properties to the novel golf ball including improved cut and abrasion resistance, cold temperature impact properties, aging properties, coefficient of restitution, and initial velocity. The composition for the cover material comprises a blend of at least three different ionic copolymers, including a copolymer of an olefin and a sodium salt of an unsaturated monocarboxylic acid, a copolymer of an olefin and a zinc salt of an unsaturated monocarboxylic acid, and a copolymer of an olefin and a lithium salt of an unsaturated monocarboxylic acid. In each of the foregoing ionic copolymers, the olefin has from 2 to 5 carbon atoms and the unsaturated monocarboxylic acid has from 3 to 8 carbon atoms. It is preferred that each of the three different ionic copolymers be present as about 20–40% by weight of the composition, and it most preferred that equal amounts by weight of each of the three different ionic copolymers be present in the composition. Golf balls injection molded with covers of the preferred compositions have exhibited superior performance in aging tests, low temperature impact tests, coefficient of restitution, and initial velocity. They are also resistant to cuts and abrasion.

DETAILED DESCRIPTION OF THE INVENTION

The subject invention relates to a novel golf ball having an improved cover made from a new composition, said composition comprising a triblend mixture of a first copolymer of an olefin having 2 to 5 carbon atoms and a sodium salt of an unsaturated carboxylic acid having 3 to 8 carbon atoms, a second copolymer of an olefin having 2 to 5 carbon atoms and a zinc salt of an unsaturated carboxylic acid having 3 to 8 carbon atoms, and a third copolymer of an olefin having 2 to 5 carbon atoms and a lithium salt of an unsaturated carboxylic acid having 3 to 8 carbon atoms. The composition contains between about 20–40 % of each of the three copolymers, and preferably contains about equal amounts of each of the three copolymers.

The copolymers of which the subject cover composition is comprised are generally described in U.S. Pat No. 3,264,272, issued Aug. 2, 1966 and assigned to E. I. du Pont de Nemours and Company, the disclosure of which is incorporated herein by reference. That patent discloses ionic copolymers comprising a polymer of an alpha-olefin having the general formula $RCH=CH_2$, where R is a radical selected from the class consisting of hydrogen and alkyl radicals having from 1 to 8 carbon atoms, and a metal salt of an alpha,beta-ethylenically unsaturated carboxylic acid having one or two carboxylic acid groups, and preferably 3 to 8 carbon atoms. In the preferred copolymers for use in the instant invention, the olefin is ethylene and the unsaturated carboxylic acid is methacrylic acid.

The triblend composition for the golf ball covers of the instant invention is most preferably prepared from Surlyn 7930, a copolymer of ethylene with a lithium salt of methacrylic acid; Surlyn 9721, a copolymer of ethylene with a zinc salt of methacrylic acid; and Surlyn 8940, a copolymer of ethylene with a sodium salt of methacrylic acid. While compositions within the scope of the instant invention may contain about 20-40% of each of the three copolymers, the preferred composition contains equal amounts of each of the three copolymers.

Those skilled in the art will recognize that certain compatible materials can be added to the cover compositions used in the golf balls of the instant invention without adversely affecting the improved properties of those compositions. The compatible materials may include coloring agents, such as dyes and pigments, fillers, antioxidants, antistatic agents, and stabilizers. These additives typically comprise no more than 5% by weight of the composition.

The golf balls of the instant invention are preferably made by injection molding the inventive triblend compositions about golf ball cores. The golf ball cores may be of either the solid type or the wound type, as is known in the art. Likewise, techniques for injection molding copolymer cover compositions about golf ball cores are also well known to those skilled in the art of golf ball manufacture.

Besides being cut and abrasion resistant, the golf balls of the instant invention exhibit a number of other superior properties as compared to golf balls of the prior art. These other superior properties include aging, low temperature impact, initial velocity, and coefficient of restitution.

Long term shelf aging properties are determined by heating golf balls at a temperature of 158° F. for 168 hours and then subjecting them to a temperature of 20° F. for 24 hours. The golf balls are then subjected to impact tests at 20° F. in which the force of a golf club head against the ball is simulated. Prior art balls having cover compositions of either 100% sodium ionomer or 100% lithium ionomer failed under impact at 20° F. in this test. Golf balls having cover compositions of the instant invention do not exhibit impact failure under these conditions.

Another important property is coefficient of restitution, which is a measure of the distance the ball will travel when struck by a golf club. The coefficient of restitution is measured by propelling a finished golf ball against a hard surface at a known velocity. After the ball has rebounded from the hard surface the velocity is measured again. The ratio of the rebound velocity over the initial velocity is the coefficient of restitution. Under typical measuring conditions, the ball is fired from a pneumatic gun having a barrel 6" long and an inner diameter of 1.696" at an air pressure of 80 p.s.i. The velocity of the ball is measured as it travels through a speed trap 4' long and positioned 3' away from the opening of the pneumatic gun. The ball travels another 4' to the rebound point. After it rebounds, its rebound velocity is measured again as it passes a second time through the speed trap. While prior art balls having cover compositions of only one ionic copolymer have coefficients of restitution of 0.618 or less, golf balls of the instant invention having triblend cover compositions have a coefficient of restitution of about 0.627, a significant improvement.

EXAMPLES

For each of the following examples, four golf balls were prepared by injection molding and tested for coefficient of restitution and initial velocity measured in feet per second (f.p.s.). In each set of four golf balls, one ball was covered with a composition comprising 100% of the lithium-based resin Surlyn 7930, a second ball was covered with a composition comprising 100% of the zinc-based resin Surlyn 9721, and a third ball was covered with a composition comprising 100% of the sodium-based resin Surlyn 8940, and the fourth ball was a novel golf ball of the instant invention covered with a triblend composition comprising equal parts of each of the aforementioned lithium, zinc, and sodium-based Surlyn resins.

Coefficient of restitution was measured in the apparatus as described above. The results of these tests are set forth in Table I.

TABLE I

| Cover Composition/ Example No. | Coefficient of Restitution | | | |
|---|---|---|---|---|
| | Surlyn 7930 (lithium) | Surlyn 9721 (zinc) | Surlyn 8940 (sodium) | Triblend |
| 1 | 0.615 | 0.610 | 0.607 | 0.628 |
| 2 | 0.618 | 0.616 | 0.614 | 0.627 |
| 3 | 0.619 | 0.616 | 0.609 | 0.629 |
| 4 | 0.620 | 0.605 | 0.598 | 0.626 |
| 5 | 0.618 | 0.607 | 0.608 | 0.625 |
| 6 | 0.620 | 0.616 | 0.612 | 0.624 |
| 7 | 0.619 | 0.610 | 0.610 | 0.627 |
| 8 | 0.623 | 0.604 | 0.600 | 0.628 |
| 9 | 0.615 | 0.616 | 0.605 | 0.628 |
| 10 | 0.612 | 0.605 | 0.607 | 0.627 |
| 11 | 0.619 | 0.615 | 0.607 | 0.627 |
| 12 | 0.616 | 0.611 | 0.612 | 0.629 |
| 13 | 0.618 | 0.610 | 0.599 | 0.623 |
| 14 | 0.612 | 0.615 | 0.613 | 0.628 |
| 15 | 0.622 | 0.607 | 0.607 | 0.628 |
| 16 | 0.620 | 0.608 | 0.608 | 0.628 |
| 17 | 0.613 | 0.608 | 0.601 | 0.629 |
| 18 | 0.613 | 0.611 | 0.612 | 0.626 |
| 19 | 0.623 | 0.608 | 0.610 | 0.623 |
| 20 | 0.620 | 0.616 | 0.613 | 0.625 |
| 21 | 0.619 | 0.610 | 0.611 | 0.628 |
| 22 | 0.620 | 0.610 | 0.612 | 0.627 |
| 23 | 0.618 | 0.616 | 0.602 | 0.627 |
| 24 | 0.612 | 0.612 | 0.611 | 0.625 |
| Average | 0.618 | 0.611 | 0.608 | 0.627 |

Initial velocity was measured with a "true temper" machine as in well-known in the art of golf ball manufacture and testing. With this machine, a golf ball is struck with a golf club head under controlled conditions such that the ball passes through a speed trap so that its initial velocity can be measured. The results of these tests are set forth in Table II in units of feet per second.

TABLE II

| Cover Composition/ Example No. | Initial Velocity | | | |
|---|---|---|---|---|
| | Surlyn 7930 (lithium) | Surlyn 9721 (zinc) | Surlyn 8940 (sodium) | Triblend |
| 1 | 211.4 | 211.3 | 210.8 | 213.8 |
| 2 | 210.5 | 211.0 | 211.1 | 214.2 |

TABLE II-continued

| Cover Composition/ Example No. | Initial Velocity | | | |
| --- | --- | --- | --- | --- |
| | Surlyn 7930 (lithium) | Surlyn 9721 (zinc) | Surlyn 8940 (sodium) | Triblend |
| 3 | 213.0 | 211.4 | 210.5 | 212.9 |
| 4 | 211.9 | 212.6 | 210.4 | 213.9 |
| 5 | 210.9 | 210.5 | 210.7 | 214.3 |
| 6 | 212.0 | 212.7 | 211.3 | 214.1 |
| 7 | 212.1 | 210.8 | 210.8 | 214.0 |
| 8 | 210.7 | 211.4 | 210.7 | 214.3 |
| 9 | 213.3 | 210.9 | 210.9 | 214.3 |
| 10 | 213.2 | 211.4 | 211.3 | 213.9 |
| 11 | 211.6 | 211.0 | 210.4 | 212.6 |
| 12 | 212.0 | 212.8 | 212.0 | 212.9 |
| 13 | 210.9 | 212.0 | 211.6 | 213.9 |
| 14 | 211.9 | 210.5 | 212.0 | 213.8 |
| 15 | 212.1 | 210.5 | 211.0 | 214.1 |
| 16 | 210.6 | 210.9 | 211.9 | 214.2 |
| 17 | 210.7 | 211.4 | 211.4 | 213.5 |
| 18 | 212.2 | 210.9 | 212.0 | 214.3 |
| 19 | 213.0 | 211.6 | 210.7 | 213.9 |
| 20 | 212.9 | 211.7 | 211.0 | 214.3 |
| 21 | 210.8 | 210.6 | 210.8 | 212.9 |
| 22 | 211.9 | 210.9 | 212.0 | 214.0 |
| 23 | 212.8 | 212.7 | 211.0 | 214.0 |
| 24 | 212.1 | 212.0 | 210.9 | 214.3 |
| Average | 211.9 | 211.4 | 211.1 | 213.9 |

From the data in Tables I and II, it may be seen that the inventive golf balls having the triblend cover compositions were significantly superior to golf balls of the prior art having cover compositions comprising a single copolymer resin material.

The inventive golf balls of Examples 1-24 having the triblend cover compositions were also tested for aging properties and cold temperature impact properties. These balls were placed in an oven at 158° F. for 168 hours, and then subjected to a temperature of 20° F. for 24 hours. The balls were then subjected to impact tests at 20° F. in which the force of a golf club head against the ball is simulated. None of the inventive balls of the 24 examples having the triblend cover composition exhibited any impact failure under these conditions.

The foregoing detailed description of the invention is by way of example and not by way of limitation. Other embodiments and modifications, which do not constitute departures from the spirit and scope of the invention, will be readily understood by those skilled in the art from the foregoing specification.

What is claimed is:

1. A golf ball comprising a core and a cover, wherein said cover comprises a blend of about 20-40% of a first ionic copolymer of an olefin having from 2 to 5 carbon atoms and a sodium salt of an unsaturated carboxylic acid having from 3 to 8 carbon atoms, about 20-40% of a second ionic copolymer of an olefin having from 2 to 5 carbon atoms and a zinc salt of an unsaturated carboxylic acid having from 3 to 8 carbon atoms, and about 20-40% of a third ionic copolymer of an olefin having from 2 to 5 carbon atoms and a lithium salt of an unsaturated carboxylic acid having from 3 to 8 carbon atoms.

2. The golf ball of claim 1 wherein said cover comprises about equal amounts by weight of each of said first, second, and third ionic copolymers.

3. The golf ball of claim 1 wherein said first ionic copolymer is a copolymer of ethylene and a sodium salt of methacrylic acid.

4. The golf ball of claim 1 wherein said second ionic copolymer is a copolymer of ethylene and a zinc salt of methacrylic acid.

5. The golf ball of claim 1 wherein said third ionic copolymer is a copolymer of ethylene and a lithium salt of methacrylic acid.

* * * * *